United States Patent
Hayashi et al.

(10) Patent No.: US 6,781,512 B2
(45) Date of Patent: Aug. 24, 2004

(54) MULTIPLE RPM INDICATING TACHOMETER FOR MOTOR VEHICLES

(75) Inventors: Toshiaki Hayashi, Uraysu (JP); Robert S. Murdock, Oakland, CA (US); Norio Fujikawa, San Francisco, CA (US); Peter Petras, San Francisco, CA (US)

(73) Assignee: Coato Workshop Inc., Tokyo (JP)

( * ) Notice: Subject to any disclaimer, the term of this patent is extended or adjusted under 35 U.S.C. 154(b) by 78 days.

(21) Appl. No.: 10/087,445

(22) Filed: Mar. 1, 2002

(65) Prior Publication Data

US 2003/0164756 A1 Sep. 4, 2003

(51) Int. Cl.[7] .................................................. B60Q 1/00
(52) U.S. Cl. ...................... 340/456; 340/439; 340/441; 340/461; 340/466; 340/969; 340/978
(58) Field of Search ................................. 340/439, 456, 340/461, 466, 471, 438, 441, 969, 978; 701/64

(56) References Cited

U.S. PATENT DOCUMENTS

| | | | |
|---|---|---|---|
| 4,631,515 A | * | 12/1986 | Blee et al. .................. 340/439 |
| 5,017,916 A | | 5/1991 | Londt et al. |
| 5,309,139 A | | 5/1994 | Austin |
| 5,420,565 A | | 5/1995 | Holbrook |
| 5,764,139 A | | 6/1998 | Nojima et al. |
| 5,941,922 A | | 8/1999 | Price et al. |
| 6,137,399 A | | 10/2000 | Westberg et al. |
| 6,462,651 B1 | * | 10/2002 | Consiglio et al. ........... 340/456 |

* cited by examiner

Primary Examiner—Jeffery Hofsass
Assistant Examiner—Hung T. Nguyen
(74) Attorney, Agent, or Firm—Townsend and Townsend and Crew LLP

(57) ABSTRACT

A novel graphical display apparatus (and methods) for motor vehicles. The apparatus has a display coupled to an interior portion of a motor vehicle and facing a driver of the motor vehicle. The display is coupled to an output for identifying a revolution per minute (RPM) value of an engine of the motor vehicle. The display has a first graphical display portion of the display for outputting a current gear indication of a current gear. The current gear is one of a plurality of gears in the motor vehicle. A second graphical display portion of the display for outputting one or more indication (s) of a past gear is coupled to the first portion of the display. The past gear is one of the plurality of gears in the motor vehicle that is used before the current gear. A third graphical display portion is also coupled to the display. The third display portion outputs an RPM value indication that corresponds to a current RPM value of the engine of the motor vehicle. The RPM value indication is coupled to the output.

19 Claims, 5 Drawing Sheets

FIRST GEAR

SECOND GEAR

THIRD GEAR

NTH GEAR

MULTIPLE RPM INDICATING TACHOMETER FOR MOTOR VEHICLES

CROSS-REFERENCES TO RELATED APPLICATIONS

This present application is related to U.S. Ser. No. 09/976,184, commonly assigned, and hereby incorporated by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to improved instrumentation for motor vehicles. In particular, the invention provides an apparatus and method for an improved display for reading revolutions per minute ("RPM") that acts as a tachometer. More particularly, the invention provides an apparatus and method for an improved display for reading revolutions per minute ("RPM") that acts as a tachometer and a current gear shift indication coupled to the display. Merely by way of example, the invention is applied to an interior of an automobile, but it would be recognized that the invention has a much broader range of applicability.

In the early days, automotive technologies were fairly crude but effective. Germany's Karl Benz has been recognized with a three-wheeled automobile he produced in 1886 as one of the first. Such automobile included an engine that was placed over its rear axle. The engine was a horizontal, four-cycle, single-cylinder type. Horsepower was limiting. Here, the engine produced about 1 horsepower. Belts and chains harnessed such power to rear wheels. A top speed of about 15 km/h could be produced. Mechanical technologies such as a lever connected to a rack-and-pinion controlled a single front wheel to steer the automobile. In the early 1900's, Ford produced a very popular automobile called "The Model T." The Model T had technologies that spread motorization. Such technologies included various mechanisms for easy driving. Examples of such mechanisms included a planetary gear transmission. Most particularly, the Model T was produced in mass production, which provided a low price to allow many people to purchase and enjoy the Model T. More than 15,000,000 units were built from 1908 to 1927, which revolutionized the automotive industry.

Many limitations exist with such early automobiles. For example, they lacked power and had numerous mechanical problems. Such problems have been addressed with many of today's conventional automobiles. These conventional automobiles such as those manufactured by Nissan Motor Company and others have horsepower greater than two hundred. Additionally, such automobiles include a wide variety of other features such as automatic windows, power steering, and even microprocessor controls. Engine speed is often displayed on a tachometer, which is indicated in revolutions-per-minute (RPM), of an automobile. Here, the current RPM of the operating engine is displayed. Often times, such display includes a needle fixed about a point that is directed to one of a plurality of numerical indications, i.e., 1000 RPM, 2000 RPM, 4000 RPM, and others.

A driver of the automobile reads the tachometer to determine whether or not to shift gears or adjust the speed of the automobile. Preferably, the operator should shift gears at selected engine speeds to extract maximum power from the engine and achieve maximum vehicle speed. Up shifting, that is, shifting to a higher transmission gear, too early often results in a loss of power and causes reduced acceleration or even stalling. Up-shifting too late may result in over-revving the engine, that is, reaching an engine speed greater than a maximum recommended speed, which can cause damage to the engine or other portions of the drive train. Downshifting, that is, shifting to a lower transmission gear, at the wrong time often causes over-revving of the engine, which is commonly called "Redlining" the engine. Redlining may lead to a blow engine, which permanently damages the engine. Unfortunately, it is often difficult to be able to shift at an appropriate time. Peak torque and even power can change. Additionally, it is often difficult for a driver to even know a peak torque value and peak power value under some or all conditions.

From the above, it is seen that techniques for improved control of automobiles is desired.

BRIEF SUMMARY OF THE INVENTION

According to the present invention, an improved instrumentation for motor vehicles is provided. In particular, the invention provides an apparatus and method for an improved display for reading revolutions per minute ("RPM") that acts as a tachometer. More particularly, the invention provides an apparatus and method for an improved display for reading revolutions per minute ("RPM") that acts as a tachometer and a current gear shift indication coupled to the display. Merely by way of example, the invention is applied to an interior of an automobile, but it would be recognized that the invention has a much broader range of applicability.

In a specific embodiment, the invention provides a novel graphical display apparatus for motor vehicles. The apparatus has a display coupled to an interior portion of a motor vehicle and facing a driver of the motor vehicle. The display is coupled to an output for identifying a revolution per minute (RPM) value of an engine of the motor vehicle. The display has a first graphical display portion of the display for outputting a current gear indication of a current gear. The current gear is one of a plurality of gears in the motor vehicle, which is being engaged by the motor vehicle. A second graphical display portion of the display for outputting one or more indication(s) of a past gear is coupled to the first portion of the display. The past gear is one of the plurality of gears in the motor vehicle that is used or has been engaged before the current gear. That is, the automobile has engaged the current gear and has disengaged the past gear. A third graphical display portion is also coupled to the display. The third display portion outputs an RPM value indication that corresponds to a current RPM value of the engine of the motor vehicle. The RPM value indication is coupled to the output, which is an interface to the engine and transmission.

In an alternative embodiment, the invention provides a method for displaying engine characteristics. The method receives gear information from an interface coupled to an engine of an operating motor vehicle. The gear information corresponds to only one of a plurality of gears numbered from 1 to N, where N is an integer greater than 1. The gear information corresponds to the gear number used by the operating motor vehicle at a present time of receiving the gear information. The method converts the gear information into a gear display format. The method displays a gear indication based upon the gear display format, where the gear indication is selected from 1 to N based upon the gear information used by the operating motor vehicle. That is the motor vehicle is in first gear, second gear, third gear, etc. The steps of receiving, converting, and displaying are repeated for other gears numbered from 1 to N as the operating motor vehicle shifts through these gears. As the steps are repeated through other gears, the gear indication revolves about a fixed axis to appear behind a current gear indication on the display. Further details of this method are provided throughout the present specification and more particularly below.

In an alternative specific embodiment, the invention provides an instrumentation system for a motor vehicle. The instrumentation system has one or more memories, which include computer codes. Such codes include a code directed to receiving a gear information from an interface coupled to an engine of an operating motor vehicle. The gear information corresponds to only one of a plurality of gears numbered from 1 to N, where N is an integer greater than 1. The gear information corresponds to the gear number used by the operating motor vehicle at a present time of receiving the gear information. A code is directed to converting the gear information into a gear display format. A code is directed to displaying a gear indication based upon the gear display format. The gear indication is selected from 1 to N based upon the gear information being used by the operating motor vehicle. A code is directed to repeating the steps of receiving, converting, and displaying for other gears numbered from 1 to N as the operating motor vehicles shifts through these gears. Depending upon the embodiment, there may also be other computer codes to carryout the functionality described herein as well as others.

In still an alternative specific embodiment, the invention provides a method for displaying engine characteristics within an interior portion of motor vehicles. The method includes receiving first gear information from an interface coupled to an engine of an operating motor vehicle. The first gear information corresponds to only one of a plurality of gears numbered from 1 to N, where N is an integer greater than 1. The first gear information corresponds to the first gear number being engaged by an operating motor vehicle at a present time of receiving the first gear information. Additionally, the method converts the first gear information into a gear display format. The method also displays a first gear indication based upon the first gear information on a first portion of a display. The first gear indication is selected from 1 to N based upon the first gear information being used by the operating motor vehicle, where N is an integer greater than 1. Next, the method moves the first gear indication from the first portion of the display to a second portion of the display. The first portion of the display appears in front of the second portion of the display in a multi-dimensional graphical format. The first gear indication is moved while replacing the first portion of the display with a second gear indication corresponding to a second gear number being engaged while disengaging the first gear number. The second gear number is among the 1 to N but not the first gear number. Further details of such embodiment are provided more fully below. Additionally, computer code directed to aspects of the method is also provided.

Numerous benefits are achieved using the present invention over conventional techniques. In a specific embodiment, the present invention provides a display having both current gear and engine speed (in RPMs) that are easy to read. The invention can also be implemented using conventional hardware and software technologies. In some embodiments, the invention provides a way of also viewing past gears, which are displayed simultaneously with the current gear indication. The present computer aided graphical displays provide an easy to read and understand representation of vehicle RPM and gear for the driver. Depending upon the embodiment, one or more of these benefits or features can be achieved. These and other benefits are described throughout the present specification and more particularly below.

The accompanying drawings, which are incorporated in and form part of the specification, illustrate embodiments of the invention and, together with the description, serve to explain the principles of the invention.

DETAILED DESCRIPTION OF THE INVENTION

According to the present invention, an improved instrumentation for motor vehicles is provided. In particular, the invention provides an apparatus and method for an improved display for reading revolutions per minute ("RPM") that acts as a tachometer. More particularly, the invention provides an apparatus and method for an improved display for reading revolutions per minute ("RPM") that acts as a tachometer and a current gear shift indication coupled to the display. Merely by way of example, the invention is applied to an interior of an automobile, but it would be recognized that the invention has a much broader range of applicability.

Figure 1:
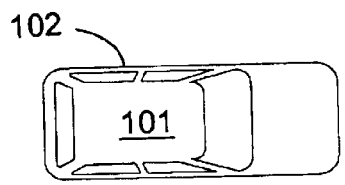
FIG. 1 is a simplified diagram of a moving automobile according to an embodiment of the present invention.
Figure 1:
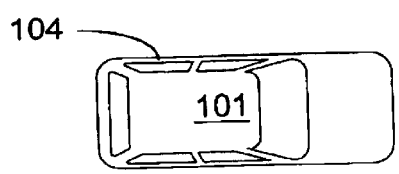
Figure 1:
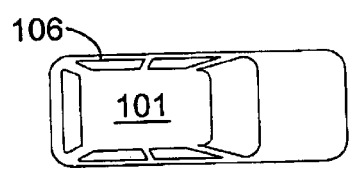
Figure 1:
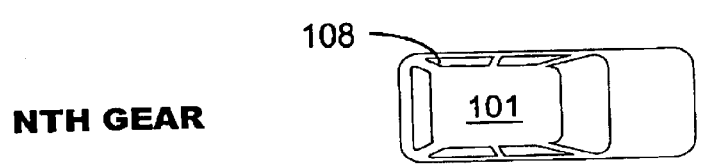

FIG. 1 is a simplified diagram 100 of a moving automobile according to an embodiment of the present invention. This diagram is merely an example, which should not unduly limit the scope of the claims herein. One of ordinary skill in the art would recognize many other variations, modifications, and alternatives. As shown, the moving automobile is illustrated as automobile 101, which shifts from first gear 102, to second gear 104, to third gear 106, and to an Nth gear 108. Going forward, the moving automobile often outputs different sounds as it goes through each gear from a low engine speed to a high engine speed. Preferably, the low engine speed and the high engine speed are within a predetermined range, which is often called the power band to achieve efficiency in the engine. As automobiles become more advanced, it may be difficult for a driver to hear any of the sounds from the engine as conventional automobiles. In a specific embodiment, the invention may provide a way to substantially maintain the automobile within the predetermined range using a novel display, method, and computer code. Details of a novel display and method for coupling engine speed to gear are described throughout the present specification and more particularly below.

Figure 2:
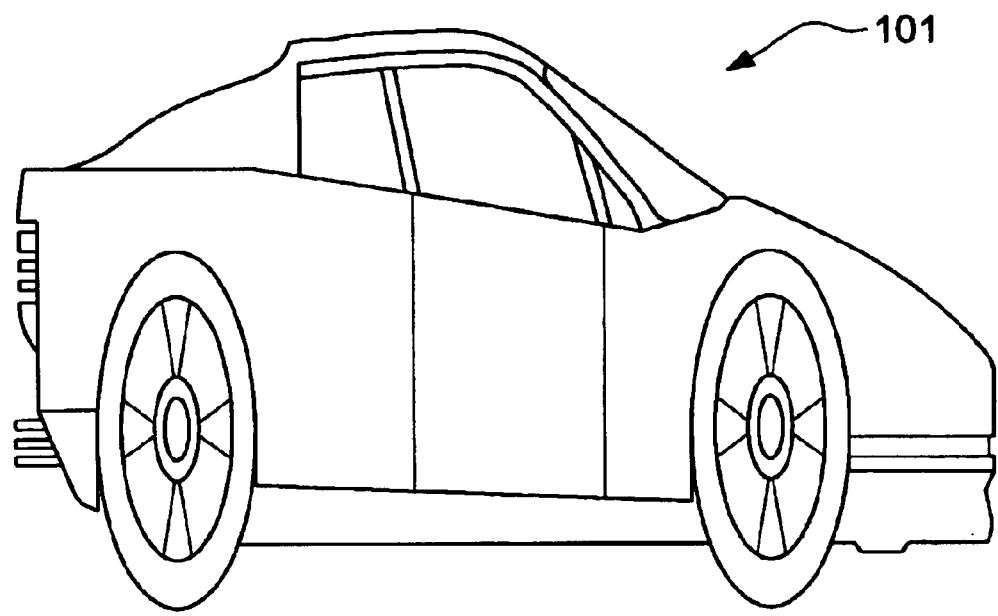
FIG. 2 is a simplified diagram of an automobile according to an alternative embodiment of the present invention.
Figure 2:
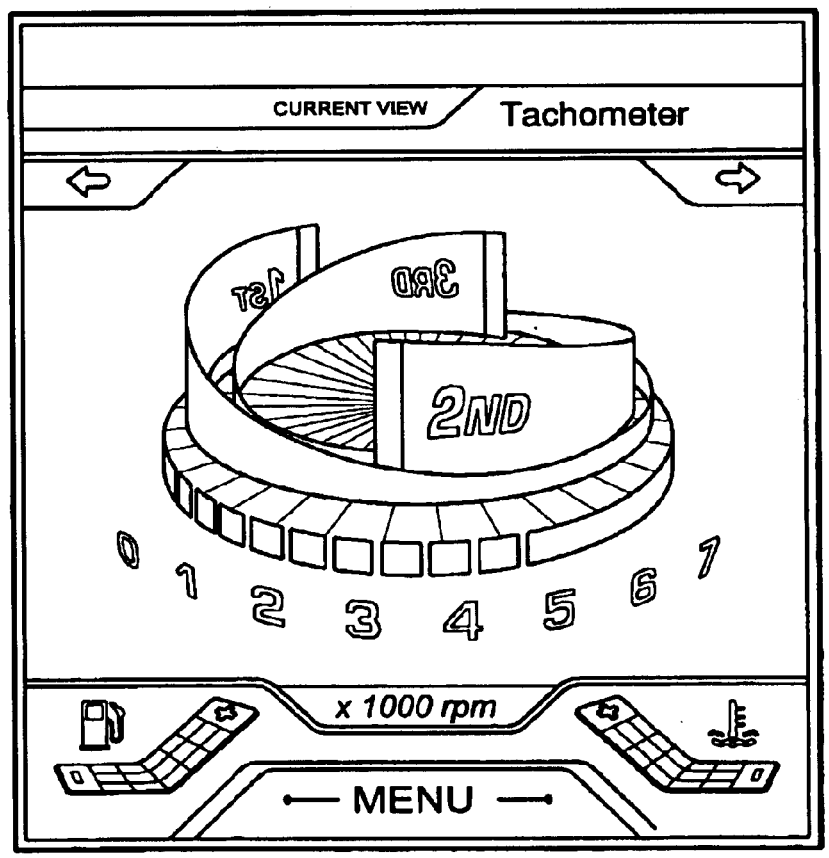

FIG. 2 is a simplified diagram of an automobile 101 according to an alternative embodiment of the present invention. This diagram is merely an example, which should not unduly limit the scope of the claims herein. One of ordinary skill in the art would recognize many other variations, modifications, and alternatives. Like reference numerals are used in the present figure as the others, but are not intended to be limiting in any manner. As shown, the diagram also includes a graphical user interface, which is a current gear and tachometer, which are coupled to each other. Such user interface faces a driver of the automobile and is coupled to a dashboard (not shown). Further details of the display are provided throughout the present specification and more particularly below.

Figure 3:
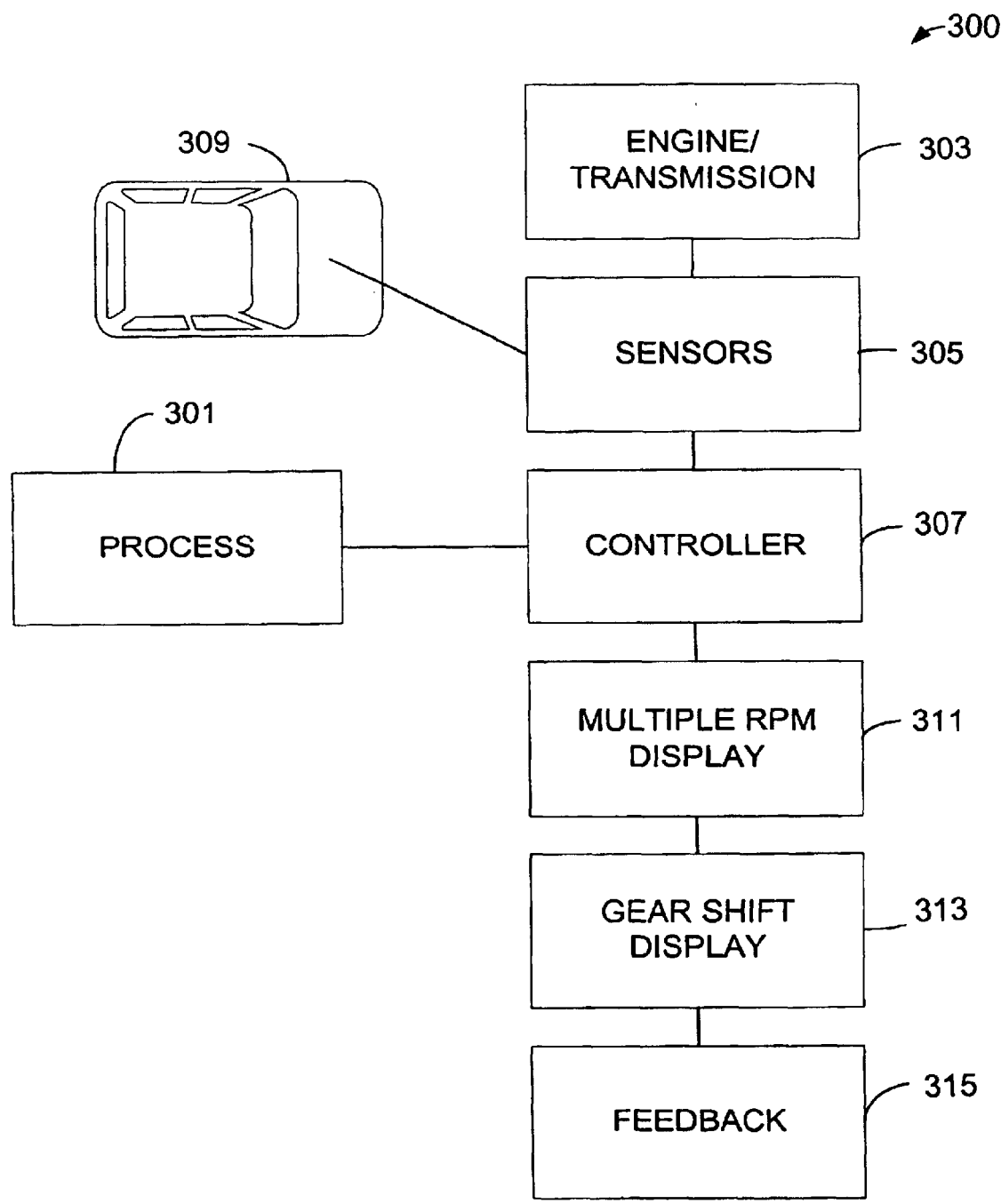
FIG. 3 is a simplified block diagram of an automotive system according to an embodiment of the present invention.

FIG. 3 is a simplified block diagram 300 of an automotive system according to an embodiment of the present invention. This diagram is merely an example, which should not unduly limit the scope of the claims herein. One of ordinary skill in the art would recognize many other variations, modifications, and alternatives. As shown, a motor vehicle includes an engine 303 and transmission, and a tachometer 311, which determines and indicates multiple RPM values to the driver of the automobile. The engine and transmission can be of any suitable type as known to one of ordinary skill in the art. The transmission has a plurality of gears, which can be engaged including a current gear, which is engaged and a plurality of different gears, which are not currently engaged but, which can be engaged. The transmission can be automatic or manual depending upon the embodiment.

Sensors 305 are operatively coupled to the engine and transmission and other components of the automobile to receive information or data indicating current operating conditions of the motor vehicle. Sensors 305 obtain information regarding the current engine RPM and current vehicle speed. As merely an example, sensors can sense sparks emitted by a running engine, which are used to determine the current engine RPM or any other suitable information to determine the current engine RPM. It is noted that alternatively, the current engine RPM can be directly provided to the tachometer. The sensors also obtain information regarding the gear the transmission is currently operating in, that is, the current gear. The sensors preferably provide, either directly or information to determine, the current speed of the automobile as well as any other desired current condition of the automobile. Additionally, sensors can be used to provide the speed or velocity of the vehicle for display. The velocity can also be provided directly to the display through a mechanical mechanism in some embodiments. The system also has a feedback mechanism 315, which is coupled to the controller. Further details of the velocity display can be found in U.S. Ser. No. 10/087,201, commonly assigned, and hereby incorporated by reference for all purposes.

As noted, the system has a variety of instrumentation. Here, the tachometer includes a central processing unit or controller 307 for determining the current engine RPM value and/or predicted engine RPM values and the display 311 for providing a visual or observable indication of the current engine RPM value and a visual or observable indication of predicted RPM values. The controller can be any suitable type having memory and processing. In preferred embodiments, the controller includes a process capable of producing a clock speed greater than about 500 Mhz to drive selected computer software for display devices. Such controller is operably coupled to sensors to receive signals from the sensors. The controller can be adapted to receive current engine RPM values and provide a suitable signal to display, which indicates the current engine RPM or adapted to receive information such as engine spark from the sensors, which determine the current engine RPM, and provide a suitable signal to the display, which indicates the current engine RPM. The speedometer is also coupled to the controller 307. Here, the controller is coupled to the engine and transmission to receive information about the engine speed. The information is converted into a format suitable for display on the speedometer. Preferably, the speedometer is a graphical user device, which is controlled by the controller. The graphical user device allows the drive to select from different conventions such as miles per hour or kilometers per hour.

The controller 307 is adapted to receive signals from the engine and/or transmission for current conditions according to certain embodiments. The controller is adapted to receive signals indicating the current gear of the transmission and the current vehicle speed. With such information and the current RPM, the controller determines predicted engine RPM values for transmission gears higher and/or lower than the current gear, which is not currently being used by the automobile. The predicted RPM values indicate or predict what the engine RPM would be if the transmission was currently engaged in a gear different from the current gear such that the drive can see the predicted effect of an immediate gear shift to a different gear. The system includes one or more processes 301 for determining the predicted engine RPM value, which are stored in memory or embedded memory. The one or more processes are preferably provided through dynamometer testing of the engine type or the specific engine but can alternatively be developed by other suitable testing or by measured results. The controller is adapted to send suitable signals indicating the predicted engine RPM values for different gears, which are not currently in use. The system also has multiple RPM display 311 and gear shift display 313. Such displays are operably coupled to the controller, which couple to the sensors. The displays are provided to indicate automobile characteristics. The display can be of any suitable type such as a CRT screen, an LED screen, a LCD screen, an analog or digital meter or gauge, or the like, which can suitably display digital and/or analog information.

In an alternative specific embodiment, the invention provides a computer aided instrumentation system for a motor vehicle. The instrumentation system has one or more memories, which include computer codes, coupled to a microprocessing device or controller device. Such codes include a code directed to receiving a gear information from an interface coupled to an engine of an operating motor vehicle. The gear information corresponds to only one of a plurality of gears numbered from 1 to N, where N is an integer greater than 1. The gear information corresponds to the gear number used by the operating motor vehicle at a present time of receiving the gear information. A code is directed to converting the gear information into a gear display format. A code is directed to displaying a gear indication based upon the gear display format. The gear indication is selected from 1 to N based upon the gear information being used by the operating motor vehicle. A code is directed to repeating the steps of receiving, converting, and displaying for other gears numbered from 1 to N as the operating motor vehicles shifts through (i.e., engages and disengages) these gears. Depending upon the embodiment, there may also be other computer codes to carryout the functionality described herein as well as others. Preferably, the system also has a code directed to outputting a past gear indication based upon the gear indication for the gear number used by the operating motor vehicle at the present time that is a past time of receiving the gear information. There may also be a code directed to outputting an RPM value indication that corresponds to a current RPM value of the engine of the operating motor vehicle, where the outputting of the RPM value indication occurs simultaneously with the outputting of the gear indication. Depending upon the embodiment, there can be other computer codes, which are with or in addition to the above, which can be stored in one or more memories of the present system. Additionally, there can be many other modifications, alternatives, and variations. Further details of the graphical user interface including methods are described throughout the present specification and more particularly below.

Figure 4:
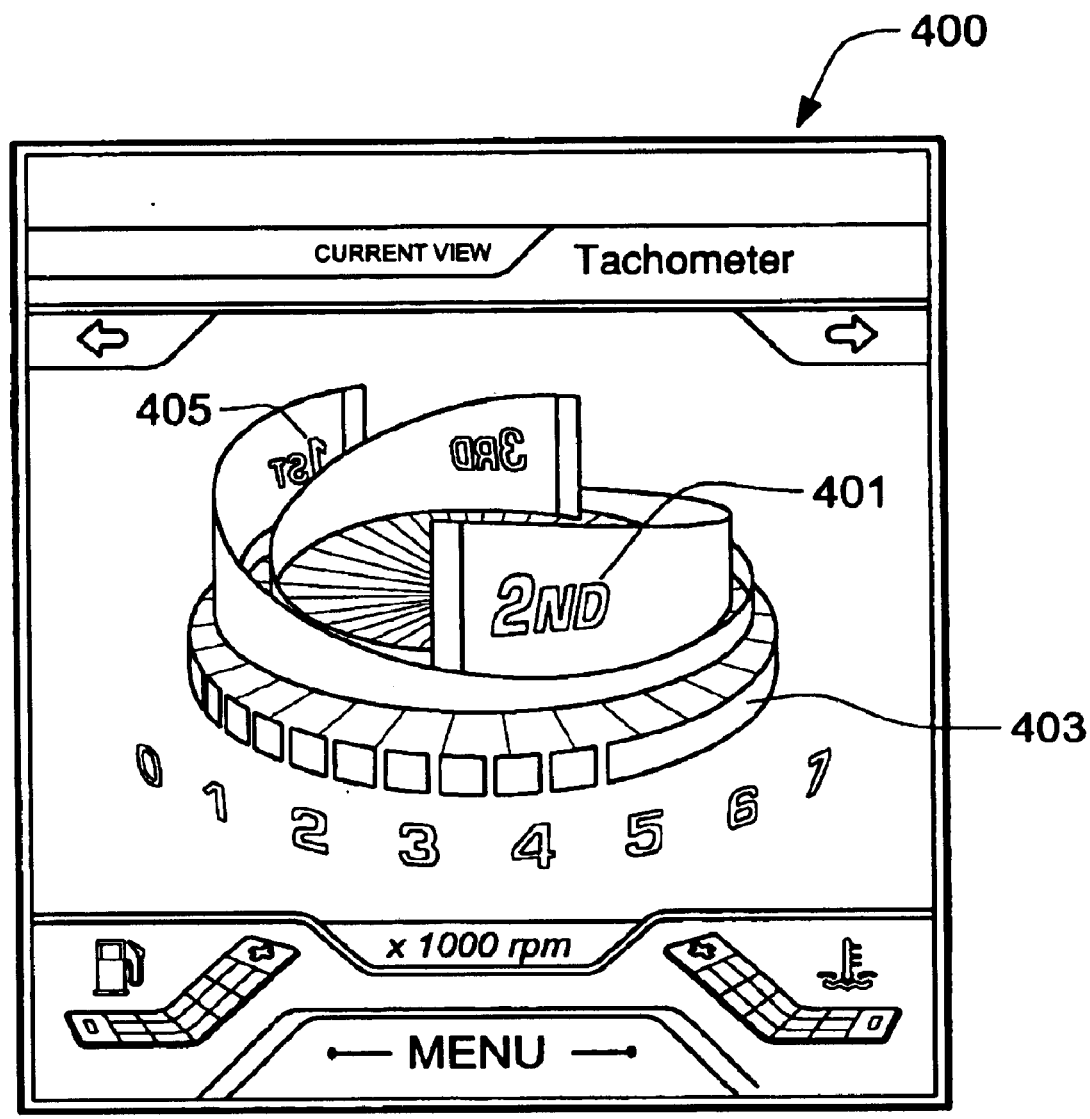
FIG. 4 is a simplified diagram of a graphical user display for a tachometer according to an embodiment of the present invention.

FIG. 4 is a simplified diagram 400 of a graphical user display for a tachometer according to an embodiment of the present invention. This diagram is merely an example, which should not unduly limit the scope of the claims herein. One of ordinary skill in the art would recognize many other variations, modifications, and alternatives. In a specific embodiment, the invention includes a graphical display apparatus for motor vehicles. A display 400 is coupled to an interior portion of a motor vehicle and facing a driver of the motor vehicle. The display is coupled to an output for identifying a revolution per minute (RPM) value of an engine of the motor vehicle. A first graphical display portion of the display for outputting a current gear indication 401 of a current gear is shown. The current gear is one of a plurality of gears in the motor vehicle. A second graphical display portion 405 of the display for outputting one or more indication(s) of a past gear is also shown. The past gear is one of the plurality of gears in the motor vehicle that is used before the current gear. Preferably, the past gear indication, which was at one time the current gear, revolved about a fixed axis from the current gear position on the display to a position that appears behind the current gear. More preferably, the current gear indication snaps from its position to the past gear indication position as the current gear is engaged and the past gear has been disengaged. The second graphical display portion is coupled to the first graphical display portion. As shown such indications give an appearance of three-dimensional graphics. A third graphical display portion of the display for outputting an RPM value indication 403 corresponds to a current RPM value of the engine of the motor vehicle. The RPM value indication is coupled to the output. The RPM value changes in the use device as the engine rotation increases. As shown, the third graphical display portion is coupled to the first graphical display portion.

Various features are included on the display depending upon the embodiment. Preferably, the current gear indication is larger in size than the one or more indication(s) of the past gear. Additionally, the display can be selected from a CRT, a flat panel display, an active matrix display, or a plasma display. In operation, one or more indication(s) of the past gear changes from a larger current gear indication to one or more of the past gear indications. The current gear indication and the one or more indication(s) of the past gear form a continuous annular structure in more than one spatial dimension. The RPM value indication comprises a range of RPM values from zero to greater than seven thousand, which is a single continuous annular structure in more than one dimension. Preferably, the current gear indication, the one or more indication(s) of the past gear, and the RPM value indication are simultaneously outputted on the display as shown, but can also be shown in other configurations. Preferably, the continuous annular structure has an appearance of revolving about a fixed axis. Such annular structure revolves as current gear indications change by way of movement of the indications about the axis. Additionally, the RPM value indications revolve as well. One of ordinary skill in the art would use graphical tools to provide the computer code to provide the movement of the annular structure. As merely an example, such graphical tools can include one made by Cinema 4D manufactured by Maxon of Germany but can be others.

Figure 5:
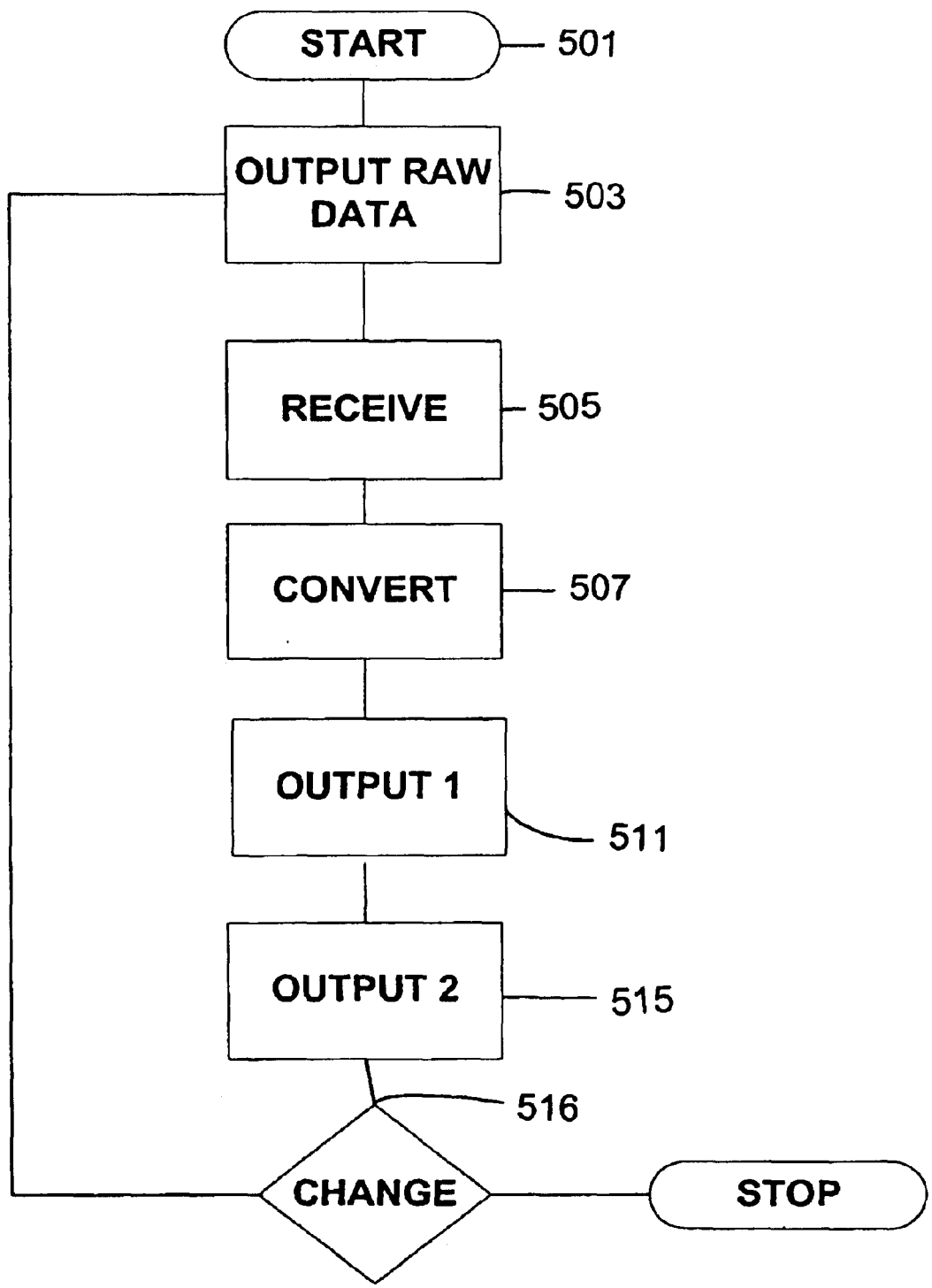
FIG. 5 is a simplified diagram of a method according to an embodiment of the present invention

FIG. 5 is a simplified diagram of a method according to an embodiment of the present invention. This diagram is merely an example, which should not unduly limit the scope of the claims herein. One of ordinary skill in the art would recognize many other variations, modifications, and alternatives. As shown, the invention is a method for displaying engine characteristics, which begins at start, step 501. The engine and transmission output data (step 503), which correspond to current gear information and other information, e.g., RPM. In a specific embodiment, the gear information is received (step 505) from an interface coupled to the engine of an operating motor vehicle. The gear information corresponds to only one of a plurality of gears numbered from 1 to N, where N is an integer greater than 1. The gear information corresponds to the gear number used by the operating motor vehicle at a present time of receiving the gear information. The method converts (step 507) the gear information into a gear display format and displays a gear indication (step 511) based upon the gear display format. The gear indication is selected from 1 to N based upon the gear information being used by the operating motor vehicle. Preferably, one or more steps are repeated for other gears numbered from 1 to N, where the integer is greater than five or six or even twelve in some embodiments. Preferably, the method also outputs a past gear indication based upon the gear indication for the gear number used by the operating motor vehicle at the present time that is a past time of receiving the gear information. The past gear indication is displayed simultaneously with the gear indication of the present time in preferred embodiments. Additionally, the past gear indication is smaller in size to the gear indication. In a specific embodiment, the method also outputs an RPM value indication (step 515) that corresponds to a current RPM value of the engine of the operating motor vehicle. The outputting of the RPM value indication occurs simultaneously with the outputting of the gear indication. The RPM value indication is coupled to the gear indication. Next, the method determines if there are any changes, step 516. If not, the method continues, alternatively, the method stops.

The above figures describe aspects of the invention illustrated by elements in simplified system and method diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. These and other variations, modifications, and alternatives will be apparent by one of ordinary skill in the art.

While the invention is described in conjunction with the preferred embodiments, this description is not intended in any way as a limitation to the scope of the invention. Modifications, changes, and variations, which are apparent to those skilled in the art can be made in the arrangement, operation and details of construction of the invention disclosed herein without departing from the spirit and scope of the invention.

What is claimed is:

1. A three-dimensional graphical display apparatus for motor vehicles, the display comprising:
   a display coupled to an interior portion of a motor vehicle and facing a driver of the motor vehicle, the display being coupled to an output for identifying a revolution per minute (RPM) value of an engine of the motor vehicle;
   a first graphical display portion of the display for outputting a current gear indication of a current gear, the current gear being one of a plurality of gears in the motor vehicle being engaged by the motor vehicle;
   a second graphical display portion of the display for outputting one or more indications of a past gear, the past gear being one of the plurality of gears in the motor vehicle that was engaged before the current gear and is disengaged by the motor vehicle, the second graphical display portion being coupled to the first graphical display portion; and
   a third graphical display portion of the display for outputting an RPM value indication that corresponds to a current RPM value of the engine of the motor vehicle, the RPM value indication being coupled to the output,
   wherein the current gear indication and the one or more indications of the past gear are displayed simultaneously.

2. The graphical display of claim 1 wherein the third graphical display portion is coupled to the first graphical display portion.

3. The graphical display of claim 1 wherein the current gear indication is larger in size than the one or more indications of the past gear.

4. The graphical display of claim 1 wherein the display is selected from a CRT, a flat panel display, an active matrix display, or a plasma display.

5. The graphical display of claim 1 wherein the motor vehicle is an automobile.

6. The graphical display of claim 1 wherein the one or more indications of the past gear changes from a larger current gear indication to one or more of the past gear indications.

7. The graphical display of claim 1 wherein the current gear indication and the one or more indications of the past gear form a continuous annular structure in more than one spatial dimension.

8. The graphical display of claim 1 wherein the RPM value indication comprises a range of RPM values from zero to greater than seven thousand.

9. The graphical display of claim 1 wherein the RPM value indication is provided as a single indication in a continuous annular structure in more than one dimension.

10. The graphical display of claim 1 wherein the current gear indication, the one or more indications of the past gear, and the RPM value indication are simultaneously outputted on the display.

11. A method for displaying engine characteristics, the method comprising:
   receiving a gear information from an interface coupled to an engine of an operating motor vehicle, the gear information corresponding to only one of a plurality of gears numbered from 1 to N, where N is an integer greater than 1, the gear information corresponding to the gear number used by the operating motor vehicle at a present time of receiving the gear information;
   converting the gear information into a gear display format;
   displaying a gear indication based upon the gear display format on a display, the gear indication being selected from 1 to N based upon the gear information being used by the operating motor vehicle;
   revolving the gear indication about an axis; and
   repeating the steps of displaying and revolving for other gears whereupon a current gear indication and a past gear indication are displayed simultaneously where the current gear indication and the past gear indication are among the 1 to N.

12. The method of claim 11 wherein N is an integer greater than six or ten.

13. The method of claim 11 further comprising outputting a past gear indication based upon the gear indication for the gear number used by the operating motor vehicle at the present time that is a past in time of receiving the gear information.

14. The method of claim 13 wherein the past gear indication is displayed simultaneously with the gear indication of the present time.

15. The method of claim 14 wherein the past gear indication is smaller in size to the gear indication.

16. The method of claim 11 further comprising outputting an RPM value indication that corresponds to a current RPM value of the engine of the operating motor vehicle.

17. The method of claim 16 wherein the outputting of the RPM value indication occurs simultaneously with the outputting of the gear indication.

18. The method of claim 17 wherein the RPM value indication is coupled to the gear indication.

19. A method for displaying engine characteristics within an interior portion of motor vehicles, the method comprising:
   receiving a first gear information from an interface coupled to an engine of an operating motor vehicle, the first gear information corresponding to only one of a plurality of gears numbered from 1 to N, where N is an integer greater than 1, the first gear information corresponding to the first gear number being engaged by an operating motor vehicle at a present time of receiving the first gear information;
   converting the first gear information into a gear display format;
   displaying a first gear indication based upon the first gear information on a first portion of a display, the first gear indication being selected from 1 to N based upon the first gear information being used by the operating motor vehicle, where N is an integer greater than 1; and
   moving the first gear indication from the first portion of the display to a second portion of the display whereupon the first portion of the display appears in front of the second portion of the display in a multi-dimensional graphical format while replacing the first portion of the display with a second gear indication corresponding to a second gear number being engaged while disengaging the first gear number, the second gear number being among the 1 to N but not the first gear number.

* * * * *